(No Model.)
W. BECKERT.
WAGON BRAKE.
No. 340,544.   Patented Apr. 27, 1886.
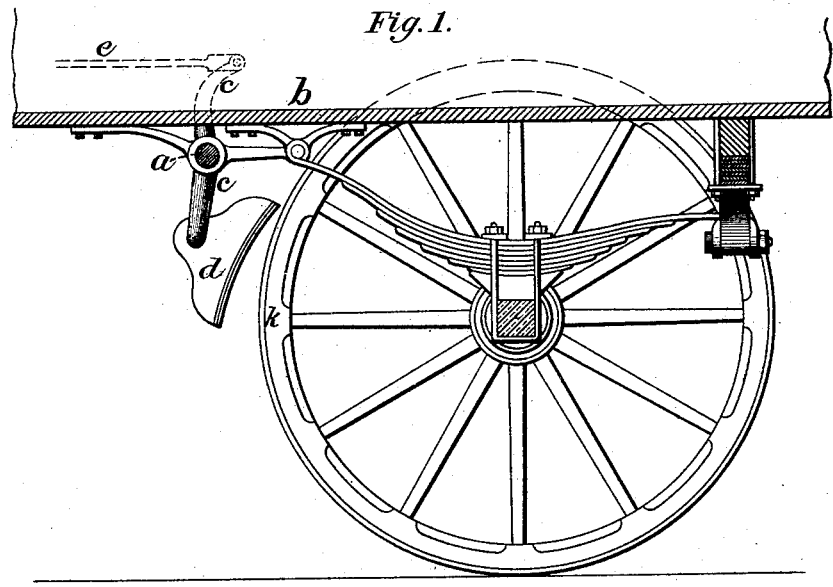
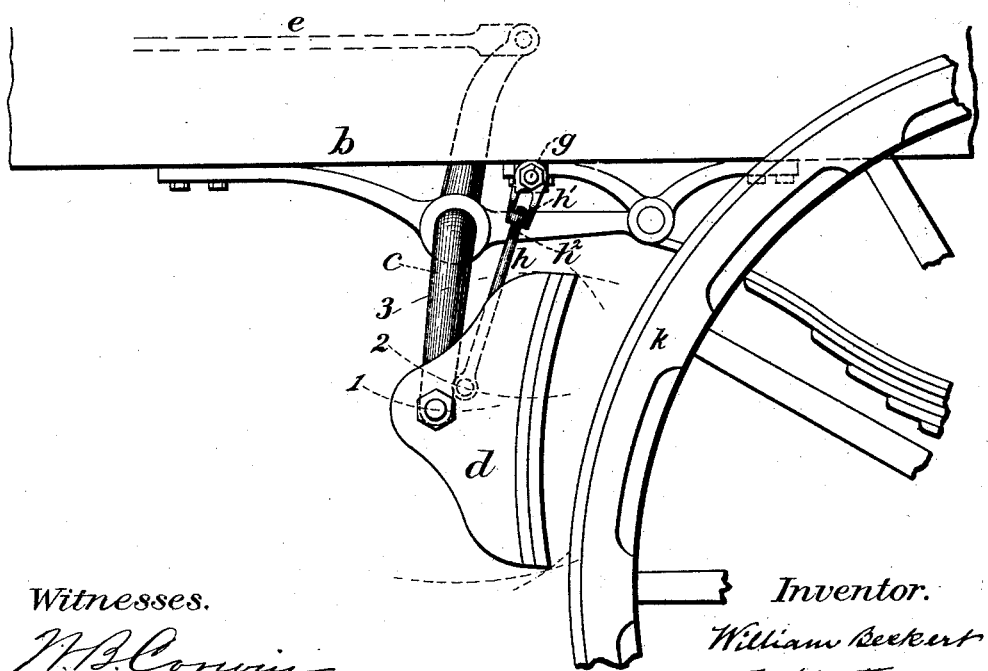
Witnesses.
W. B. Corwin
Harry L. Gill
Inventor.
William Beckert
by his attys
Bakewell & Kerr

UNITED STATES PATENT OFFICE.

WILLIAM BECKERT, OF ALLEGHENY CITY, PENNSYLVANIA.

WAGON-BRAKE.

SPECIFICATION forming part of Letters Patent No. 340,544, dated April 27, 1886.

Application filed March 9, 1885. Serial No. 158,155. (No model.)

*To all whom it may concern:*

Be it known that I, WILLIAM BECKERT, of Allegheny City, in the county of Allegheny and State of Pennsylvania, have invented a new and useful Improvement in Spring-Wagon Brakes; and I do hereby declare the following to be a full, clear, and exact description thereof.

In the ordinary application of brakes to wagons the rubber-block has been hung on a lever mounted on a rock-shaft which was connected to the brake-lever by a rod. The block-lever was attached to the block at or near the middle of its rear side, and the rubbing or clamping surface extended about equally above or below the point of attachment. As the lever in applying and retracting the block described the arc of a circle, the movement of the upper end of the rubber-block was much more limited than that of the lower end, so that without unduly increasing the throw of the operating-lever, the upper part of the rubber could not be drawn back very far from the wheel, and consequently was often partially in contact with the tire when it should be back out of the range of the same. This was particularly the case with spring-wagons, in which a load which depressed the body on the springs would cause the block to approach the wheel, and, indeed, often come in contact with the face of the tire and bear against it, so as to wear off the upper end of the block and create unnecessary friction. To prevent this it has been necessary to give the operating-lever a very long throw, whereby the rubber block was enabled to be drawn back farther from the tire.

My improvement enables me to give a long throw to the upper end of the block, so as to give clearance of the mud, and prevent the block from striking the wheel when the wagon is loaded without increasing the length or throw of the operating-lever.

To enable others skilled in the art to make and use my invention, I will now describe it by reference to the accompanying drawings, in which—

Figure 1 is a longitudinal vertical section of a portion of a spring-wagon provided with the old construction. Fig. 2 is a side view of my improvement.

Like letters of reference indicate like parts.

Mounted on a rock-shaft, $a$, at the side of the body $b$ of a spring-wagon is a lever, $c$, to the lower end of which is pivoted the rubber or brake block $d$. The upper end of the lever $c$ is connected to a rod, $e$, which leads forward to the usual operating-lever. There is a brake-block, $d$, at each side of the wagon, the one on the opposite side being mounted on a radial arm like that part of the lever $c$ which is below the rock-shaft $a$, the operating-lever and its connecting-rod $e$ being on one side of the wagon or in the center only. These parts are constructed and arranged as usual, except that the rubber $d$ is made longer than ordinarily.

Pivoted to a suitable pin or projection, $g$, secured to the wagon-body $b$, or other suitable part before or behind the shaft $c$, is a rod or link, $h$, the other end of which is pivotally attached to the rubber $d$ at one side of the point of attachment of the latter to the lever $c$. The effect of the link $h$ on the rubber $d$ is to cause its upper end to be thrown much farther back from the wheel $k$ on the retraction of the rubber by the lever $c$ than the lower end, as shown in Fig. 2. While the lower end of the lever $c$ is describing an arc of a circle, $l$, the lower end of the link $h$ describes an arc of a smaller circle, 2, which causes the rubber $d$ to turn on its pivotal point, so that its upper end describes an arc, 3, which throws it a greater distance than the lower end, so as to allow the mud which collects on the tire to pass, and prevents its being scraped off and collected by the rubber, and thereby obviates unnecessary friction. In addition to this it causes the rubber, when retracted, to clear the wheel when the body is depressed by a heavy load. In the ordinary construction (shown in Fig. 1) this is the case with the lower end of the rubber; but the rubber being placed above a horizontal plane bisecting the wheel, and the upper end being over or above the tire, the depression of the body brings such upper end in contact with the wheel. In my improved construction the lower end of the rubber is retracted as far as necessary, and the upper end is thrown back a sufficient distance to prevent it from coming in contact with the wheel, either by the loading down of the body or by the lunging of the same under a heavy load. For this reason I am enabled to make the rubber longer than in the common construction, and thus obtain more bearing-surface and greater friction, and consequently a stronger and firmer brake.

In order to be able to adjust the circular throw of the rubber, I provide the link $h$ with an adjustment which consists of a screw-socket, $h'$, and a threaded stem, $h^2$, whereby the link $h$ can be shortened or lengthened at pleasure. I do not limit myself to this construction, as it is apparent that other devices may be adopted by the skilled mechanic for effecting such adjustment and the backward movement of the upper end of the rubber. The link $h$ requires to be connected to the bed or other part and to the rubber $d$ at one side of the lever $c$, so that the movement of the lever $c$ shall cause the rubber to be turned on its pivot by means of the link $h$, and thereby have a longer throw at the upper end. I do not desire to claim, broadly, a link secured to the rubber and the body of the wagon.

What I claim as my invention, and desire to secure by Letters Patent, is—

1. In a spring-vehicle, the combination of the lever $c$, rubber $d$, and the single link $h$, pivoted directly to the body of the wagon and to the upper part of the rubber above the pivotal point of the lever to the rubber, so as to impart an axial movement to the rubber from the movement of the lever, substantially as and for the purpose specified.

2. The combination of the lever $c$, rubber $d$, and adjustable pivoted link $h$, substantially as and for the purposes described.

In testimony whereof I have hereunto set my hand this 3d day of March, A. D. 1885.

WILLIAM BECKERT.

Witnesses:
W. B. CORWIN,
J. K. SMITH.